No. 676,176. Patented June 11, 1901.
J. W. CONWAY & J. McCARTHY.
HEATING APPARATUS.
(Application filed Jan. 7, 1901.)
(No Model.)
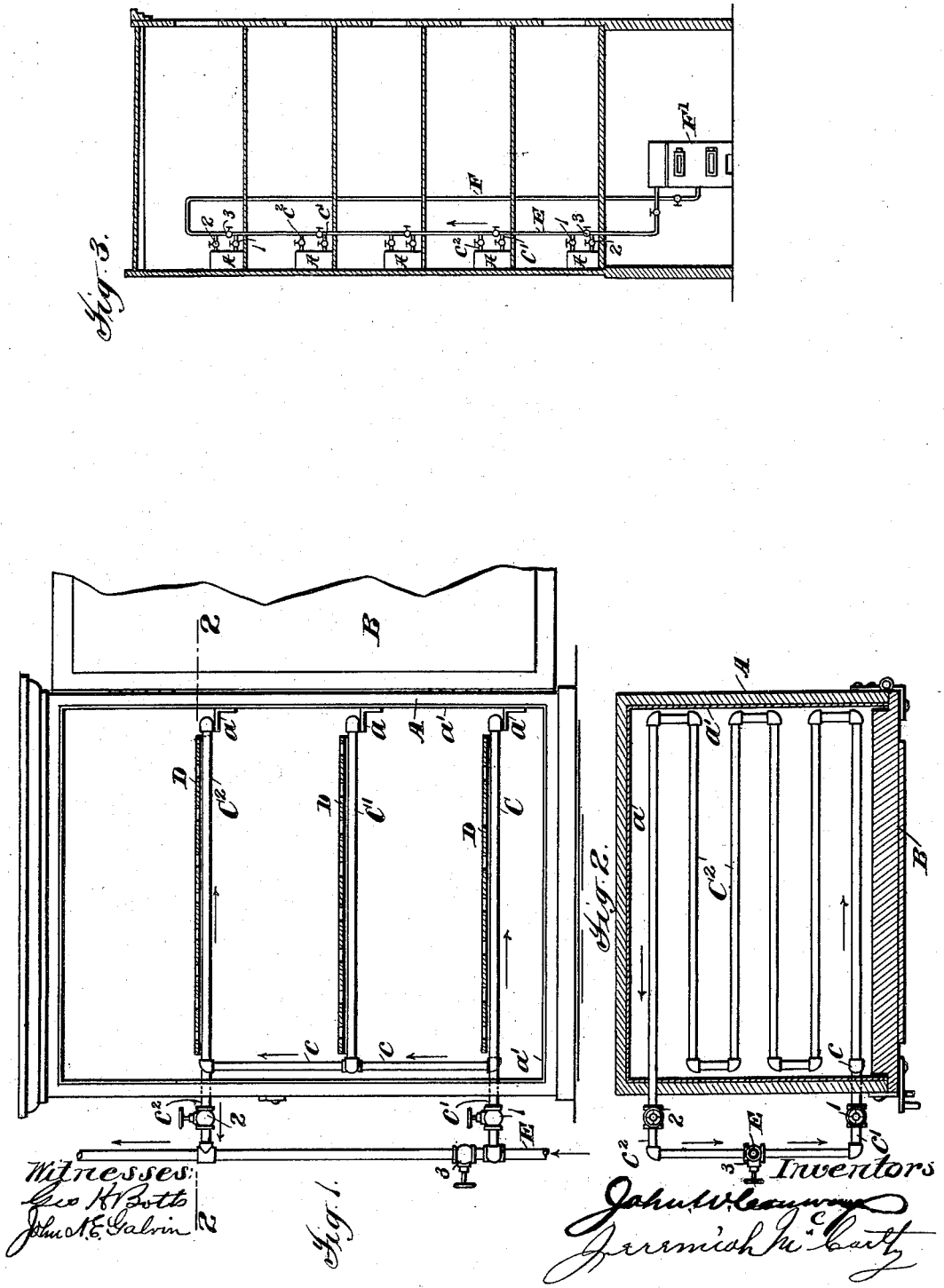

UNITED STATES PATENT OFFICE.

JOHN W. CONWAY AND JEREMIAH McCARTHY, OF NEW YORK, N. Y.

HEATING APPARATUS.

SPECIFICATION forming part of Letters Patent No. 676,176, dated June 11, 1901.

Application filed January 7, 1901. Serial No. 42,273. (No model.)

*To all whom it may concern:*

Be it known that we, JOHN W. CONWAY and JEREMIAH McCARTHY, citizens of the United States, residing at New York city, county of New York, and State of New York, have invented certain new and useful Improvements in Heating Apparatus, fully described and represented in the following specification and the accompanying drawings, forming a part of the same.

This invention relates to a heating apparatus of such a form as to provide a means by which articles of food, dishes, &c., may be kept at a proper temperature in hotels, apartment-houses, flat-houses, &c., while the cooking of the food is taking place or for reheating the food after being cooked and when about to be used. In houses of the kind above referred to, especially in apartment-houses and flat-houses, the cooking is to a great extent now being done with gas-ranges or gas-stoves, and it has been found that the means provided by said ranges or stoves for the reheating of food or heating dishes about to be used in a proper manner are limited to a great extent. The heat being a dry heat also tends to dry the food and also to crack and ruin the dishes.

The object of this invention, therefore, is to provide a constant relatively moist heat for the purpose above mentioned which will be readily accessible to persons desiring to use the same.

To this end the invention consists in a heating-receptacle suitably placed in a room, said receptacle containing a coil or coils of suitable piping through which hot water of a proper temperature is caused to circulate.

The object of the invention is also to arrange these receptacles or closets in the several apartments or floors of the house in which they are to be used in such a manner as to be simultaneously supplied with hot water from a boiler or other hot-water supply.

In the accompanying drawings, Figure 1 is a front elevation of one of the heating receptacles or closets, the door of the receptacle being open. Fig. 2 is a sectional plan view of same, taken on the line 2 2 of Fig. 1. Fig. 3 is a diagrammatic sectional elevation of the several floors of a house provided with the heating-receptacle.

Referring now to Figs. 1 and 2, A is a heating receptacle or closet which may be of any preferred form and construction. The receptacle is provided with a door B, through which the articles to be heated are passed. Heating-coils C C' $C^2$, which may be of any form or size, but which are preferably of the form shown in Fig. 2, are supported one above the other inside the receptacle A on supports $a$, which are riveted or secured in any suitable manner to the lining $a$ of the receptacle. This lining may be of asbestos or other suitable material. Placed on the top of the coils C C' $C^2$ are perforated trays D, preferably turned down at their ends so as to lap over the heating-coils and prevent the tray with the articles to be heated from moving with respect to the heating-coils. The heating-coils C C' $C^2$ are connected one to the other by vertical pipes $c$, thus providing a continuous circulation of water through all the coils. The coil C at the bottom of the receptacle is connected to a service-pipe E by a connection $c'$, and the coil $C^2$ at the upper part of the box is connected to the pipe E by a connection $c^2$. The pipe $c'$ is provided with a cock 1, and the pipe $c^2$ is provided with a cock 2, whereby the supply of water from the service-pipe E to the coils C C' $C^2$ is stopped when the receptacle is not in use. The service-pipe E is provided with a cock 3, located between the pipes $c'$ $c^2$ and which is closed when the coils in the receptacle A are to be supplied with water from the service-pipe E.

The operation of the apparatus is as follows: Referring to Fig. 3, assuming that the cocks 1 and 2 in the pipes $c'$ $c^2$ are open and the cock 3 in the pipe E closed, then the hot water will pass from the hot-water supply F' through the pipe E, thence through pipe $c'$ to the coil C, thence to coil C' through vertical pipe $c$, thence to the coil $C^2$ through a similar pipe $c$, and thence through pipe $c^2$ to the service-pipe E. The water will then pass upward to the floor above, where a similar heating-receptacle A is situated, thence in turn to the floor above, and so on until all of the receptacles have been in turn supplied with hot water. The water will then pass through the return-pipe F to the boiler F'. When it is necessary to cut off the water-supply to any one of the receptacles, the cocks 1 and 2 of the pipes $c'$ $c^2$ will be closed and the cock 3 of the service-pipe E opened, the section of pipe E between the pipes $c'$ $c^2$ acting as a by-pass for the passage of water to the next receptacle. The connections to all the receptacles are similar in construction in all the apartments.

What is claimed is—

1. In a system of warming-closets, the combination with a vertical riser-pipe, and a receptacle for the reception of the articles to be warmed, of a plurality of coils located in different horizontal planes within the receptacle and connected with each other, an inlet connecting the lowest coil to the riser-pipe and an outlet connecting the highest coil to said riser-pipe above the inlet.

2. In a system of warming-closets, the combination, with a vertical riser-pipe, and a receptacle for the reception of the articles to be warmed, of a plurality of coils located within the receptacle in different horizontal planes and connected with each other, an inlet connecting the lowest coil to the riser-pipe, an outlet connecting the highest coil to said riser-pipe above the inlet, and a cock in the riser-pipe between said inlet and outlet.

3. In a system of warming-closets, the combination with a vertical riser-pipe, and a receptacle for the reception of the articles to be warmed, of a plurality of coils located within the receptacle in different horizontal planes and connected with each other, an inlet connecting the lowest coil with the riser-pipe, an outlet connecting the highest coil to said riser-pipe above the inlet, a cock in the riser-pipe between the inlet and outlet, and cocks in the inlet and outlet respectively.

4. In a system of warming-closets, the combination with a vertical riser-pipe, and a plurality of receptacles for the reception of the articles to be warmed, said receptacles being located one above the other, of a plurality of coils in each receptacle, said coils being located in different horizontal planes and connected with each other, an inlet connecting the lowest coil of each receptacle to the riser-pipe, an outlet connecting the highest coil of each receptacle to the said riser-pipe above its respective inlet, a plurality of cocks in the riser-pipe between the respective inlets and outlets, a boiler connected to the lower end of the riser-pipe, and an uninterrupted return-pipe connecting the upper end of the riser-pipe with the boiler.

In witness whereof we have hereunto set our hands in the presence of two subscribing witnesses.

JOHN W. CONWAY.
JEREMIAH McCARTHY.

Witnesses:
GEORGE H. BOTTS,
JOHN A. E. GALVIN.